(12) United States Patent
Groset et al.

(10) Patent No.: US 9,751,010 B2
(45) Date of Patent: *Sep. 5, 2017

(54) SYSTEM AND METHOD FOR VIRTUAL TEAM ASSEMBLY

(71) Applicant: Fantasy Sports Company, Carlsbad, CA (US)

(72) Inventors: Peter Groset, Carlsbad, CA (US); Erik Groset, Carlsbad, CA (US); William Switzer, San Diego, CA (US)

(73) Assignee: Fantasy Sports Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,457

(22) Filed: Sep. 16, 2016

(65) Prior Publication Data

US 2017/0080335 A1    Mar. 23, 2017

Related U.S. Application Data

(60) Provisional application No. 62/220,665, filed on Sep. 18, 2015.

(51) Int. Cl.
*A63F 13/35* (2014.01)
*G06F 17/30* (2006.01)
(Continued)

(52) U.S. Cl.
CPC ............ *A63F 13/35* (2014.09); *A63F 13/79* (2014.09); *A63F 13/828* (2014.09); *A63F 13/92* (2014.09);
(Continued)

(58) Field of Classification Search
CPC ........ A63F 13/65; A63F 13/79; A63F 13/828; A63F 13/335; A63F 13/35; G06F 17/3087
See application file for complete search history.

(56) References Cited

U.S. PATENT DOCUMENTS

| | | | |
|---|---|---|---|
| 8,762,285 B2 * | 6/2014 | Davis | G06Q 30/02 705/319 |
| 2014/0274390 A1 * | 9/2014 | Kasten | A63F 13/12 463/31 |
| 2015/0298000 A1 | 10/2015 | Hirsch | |

OTHER PUBLICATIONS

Buchanan, Steve. "MLB Cheat Sheet: September 8th." *Playbook.* Draft Kings, Sep. 8, 2016. Web. Retrieved from Web Sep. 14, 2016. pp. 1-4. https://playbook.draftkings.com/mlb/mlb-cheat-sheet-september-8th-2.

(Continued)

*Primary Examiner* — William H McCulloch, Jr.
*Assistant Examiner* — Yingchuan Zhang
(74) *Attorney, Agent, or Firm* — Mintz Levin Cohn Ferris Glovsky and Popeo, P.C.

(57) ABSTRACT

A collection of data corresponding to a player is assembled at a server from a data provider. A base value of the player based on at least the primary data is added as an attribute to an internal object stored at the server. A modifier is mapped to a second attribute of the internal object. The modifier is based on at least a portion of the secondary data and the tertiary data. A projected value is generated from the base value by applying a modifier and a rule converting the modified second attribute to a projected value. Internal objects are generated according to constraints including having a sum of limiting factors of the internal objects that does not exceed a maximum factor and a sum of projected values a maximum, subject to the first constraint. The server transmits application data including a list representing the internal objects.

18 Claims, 9 Drawing Sheets

(51) Int. Cl.
*A63F 13/92* (2014.01)
*A63F 13/828* (2014.01)
*A63F 13/79* (2014.01)
*G06Q 50/00* (2012.01)

(52) U.S. Cl.
CPC .... *G06F 17/3087* (2013.01); *G06F 17/30867* (2013.01); *G06Q 50/00* (2013.01)

(56) References Cited

OTHER PUBLICATIONS

DraftKings. "DK Live—Fantasy Sports Play by Play and News." *iTunes App Store Preview.* Apple. Sep. 11, 2016. Web. Retrieved from Web Sep. 14, 2016. pp. 1-2. https://itunes.apple.com/us/app/dk-live-fantasy-sports-play/id1142334232?mt=8.

* cited by examiner

Fig. 5

SYSTEM AND METHOD FOR VIRTUAL TEAM ASSEMBLY

CROSS-REFERENCE TO RELATED APPLICATIONS

The current application is related to/claims priority under 35 U.S.C. §119(a) to U.S. Provisional Patent Application No. 62/220,665 filed Sep. 18, 2015, the contents of which are hereby incorporated by reference in its entirety.

TECHNICAL FIELD

The subject matter described herein relates to data transfer and analysis for display on operator interfaces for electronic gaming applications.

BACKGROUND

Virtual sports teams, for example, those used in "fantasy football," "fantasy baseball," "daily" fantasy sports, or the like, are selected by users based on their knowledge of individual players and how they expect them to perform. Once a team is selected, the performance of the players that make up the virtual team is based on how they perform in actual games. The results are combined for all players on the team, and the virtual team that has the best performance is declared the winner.

SUMMARY

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

A collection of data is assembled from a data provider over a network connection by a server. The assembling includes first querying, by the server over the network connection through an application programming interface, the data provider for primary data corresponding to a player. The primary data includes at least one of a set of statistics for the player, a limiting factor for the player, and a location of an upcoming event that includes the player. Also, the assembling includes second querying, by the server over the network connection, the data provider for secondary data corresponding to the player. The secondary data includes at least one of a prediction and the location. Also, the assembling includes third querying, by the server over the network connection through another application programming interface, the data provider for tertiary data. The tertiary data can include a weather condition at the location.

A base value of the player based on at least the primary data is added as an attribute to an internal object stored at the server. A modifier is mapped to a second attribute of the internal object. The modifier is based on at least a portion of the secondary data and the tertiary data.

A projected value is generated from the base value by at least first applying the modifier to the second attribute according to the mapping and second applying a rule converting the modified second attribute to a projected value.

The automated projection engine generates internal objects according to constraints including a first constraint having a sum of the limiting factors of the plurality of internal objects that does not exceed a maximum factor and a second constraint where a sum of the projected values of the internal objects is a maximum, subject to the first constraint.

The server transmits, over the network connection to a mobile application running on a mobile device, application data including a list representing the internal objects.

In some variations one or more of the following features can optionally be included in any feasible combination.

The server can receive, from a mobile application running on a mobile device, a request for the application data including a player lineup generated from the list of the plurality of internal objects. Also, the application data can be transmitted to the mobile device in response to the request.

The modifying of the second attribute can also include calculating the projected value further based on weather statistics corresponding to a weather performance of the player under prior weather conditions similar to the weather condition returned by the third querying.

The second querying can include retrieving an upcoming location for the upcoming event and retrieving location statistics corresponding to a location performance of the player for prior events at the upcoming location. The modifying can also include calculating the projected value further based on the location statistics of the player at the upcoming location returned by the second querying.

The second querying can include retrieving matchup statistics corresponding to a matchup performance between the player and an opponent. The modifying can also include calculating the projected value further based on the matchup performance of the player returned by the second querying.

The server can receive, from the at least one data provider, an electronic indication that a change has been made to the primary data. The change can be representative of an instant event that occurred in a game in which the player is currently participating. The rule can be applied to include the change in the primary data for calculating a current score for the player. The current score can be transmitted to the mobile application for display at the mobile device.

The server can monitor at least one of the data providers for the change and transmit, to the data provider, a request for the change. An identification of the player and the instant event can be transmitted to the mobile application.

The secondary data and the tertiary data can correspond only to the upcoming event and not to additional events subsequent to the upcoming event.

From the mobile application, a preference weight can be received that represents the desire for the player to be represented in the plurality of internal objects and the generated internal objects can be further based on the preference weight.

A minimum preference weight can preclude the player from being represented as part of the plurality of internal objects, and a maximum preference weight can guarantee the player will be represented as part of the internal objects unless the sum of the limiting factors of the internal objects exceeds the maximum factor.

The primary data, secondary data, and tertiary data can be accessed through relational database queries from a database server.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 is a screen capture illustrating matchups between competing players in accordance with certain aspects of the present disclosure;

When practical, similar reference numbers denote similar structures, features, or elements.

DETAILED DESCRIPTION

The current subject matter provides a system and/or method for generating a statistically improved lineup of players, typically used by persons playing fantasy sports games. Generation of the lineup can include the determination and application of modifiers to predetermined player statistics in order to more accurately predict their performance in an upcoming competition.

Virtual team competitions, for example, fantasy football, fantasy baseball, fantasy basketball, fantasy soccer, fantasy hockey, fantasy golf, car racing, fantasy fishing, fantasy boxing, fantasy bowling, fantasy tennis, or the like, as well as all of the above as "daily" fantasy sports, typically involve the selection of real competitors and determining virtual teams as if they were comprised of these real competitors. The performance of the real competitors can be tabulated over some period of time and a cumulative score is calculated for each of the virtual teams. Whatever virtual team has the highest score at some predetermined period of time is declared the winner. While some virtual competitions provide little to no restrictions on who can be selected for the virtual teams, others limit the selection according to one or more rules. For example, a provider of a virtual competition can assign a point value, salary value, or the like to the players according to historical performance or any other measure. The limits are typically chosen such that all of the best players cannot be selected and a user must rely on their own skill in choosing an optimal lineup.

Rather than relying solely on the skill of the user in determining and optimal lineup, the present subject matter describes implementing data aggregation from multiple sources to provide an intelligent, near-term optimization of lineup selection. By particular emphasis being given to competitions in the near future, additional data can be acquired and utilized in order to make a more accurate prediction than would otherwise be possible by just a human user. The subject matter described herein thus provides an improvement to the technical field of electronic gaming by, among other things, enhancing the ability of players and virtual competition providers to have more accurate gaming experiences.

Figure 1:
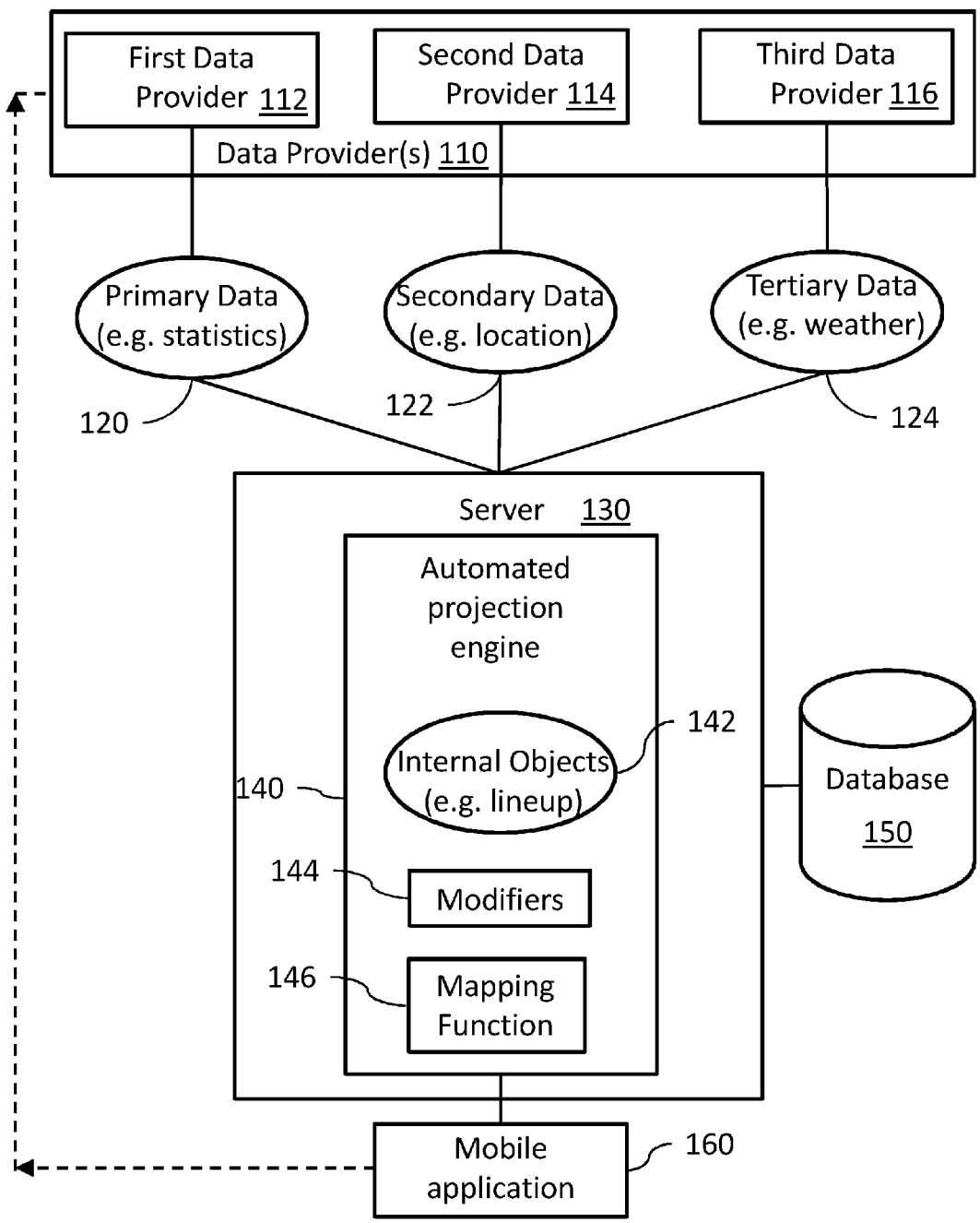
FIG. 1 is a diagram illustrating an automated projection engine generating a collection of internal objects representing a player lineup to a mobile application in accordance with certain aspects of the present disclosure.

FIG. 1 is a diagram illustrating an automated projection engine 140 generating a collection of internal objects 142 representing a player lineup to a mobile application 160 in accordance with certain aspects of the present disclosure. The automated projection engine 140 can automatically assemble, over a network connection by a server 130 and at a pre-defined time interval, a collection of data from at least one data provider. Data providers can include, for example, a fantasy sports operator or computer server 130, websites, server 130s with sports data, web logs, databases, or the like. The collection of data can include, for example, player statistics, live scores, Vegas odds, schedules, player salaries, weather data, or the like. The collection of data can be stored and further processed to generate the lineup as described in further detail below. The collection of data can be in a number of different formats, for example, HTML, XML, JSON, or the like.

As input, the automated projection engine 140 can ingest, for example, primary data 120, secondary data 122, tertiary data 124, or the like, from any number or combination of data providers 110. In one implementation, the primary player data 140 can be acquired from a first data provider 112, for example, either by request from the automated projection engine 140 or as a result of a push operation from the provider 112. As one example, the server 130 can transmit a query over the network connection through an application programming interface to the first data provider 112 for primary data 120. Similarly, the server 130 can transmit queries over the network connection via the same or other application programming interfaces, to the second data provider 114 for the secondary data 122, to the third data provider 116 for the tertiary data 124, or the like. The queries can include, for example, a simple request for the data, scraping information from websites, blogs, newsfeeds, or the like. The secondary data 122 and/or tertiary data 124 providers can be computing systems connected through a network, for example, official sports sponsor websites, databases, Internet sources, weather reporting and prediction services, or the like. The automated projection engine 140 can be executed on one or more computing systems, for example, a server 130, a desktop computer, laptop computer, a mobile device, a tablet device, or the like. Mobile devices can include, for example, smartphones, personal data assistants, laptop computers, tablet computers, or the like. While many implementations herein are described as interfaced with a mobile application 160 on a mobile device, any of the features described herein can be implemented on other types of computing systems, for example those mentioned above, and should not limited to only interfacing with mobile devices and mobile applications.

In some implementations, the data can be retrieved automatically, without receiving a specific request from a user. The automatic retrieval can be, for example, at particular times, hourly, daily, weekly, or the like. Automatic retrieval can be in response to an event, such as a completion of a competition, reporting of an injury, the updating of a scoring web site.

The collection of data can be stored on other connected computing systems, for example in a relational database located at the server 130 or on another networked computer. In some implementations, when the collection of data is stored on a relational database, queries to access the data can be in the form of SQL queries. These queries can be similar to those sent to the first data provider 112, second data provider 114, and third data provider 116 in that they can request information for the automated projection engine 140 to use when determining projected player values and lineups.

As used herein, the terms "primary data 120," "secondary data 122," "tertiary data 124," "first data provider 112," "second data provider 114," and "third data provider 116" are intended to only provide clarity when distinguishing between different data sources or groups of data. For example, in some implementations, primary data 120 and secondary data 122 could come from any one of the data providers. Similarly, any combination of data used herein can come from any combination or number of data providers.

Also as used herein, the term "scraping" can include, for example, text grepping and expression matching, webpage retrieval, text parsers, document object model parsing, semantic annotation recognition, computer vision analysis of internet content, or the like.

The primary data 120 can correspond to a player and include a set of statistics for the player. As used herein, the term "player" can correspond to a player of a sporting event or member of a sporting team. The statistics can be column-based or row-based tables, lists, or other types of files or electronic data that can be interpreted by the automated projection engine 140.

The statistics can be any sort of data, or reference to data, that describes results, statistics, historical performance, attributes, or the like, of one or more players. For example, a baseball player can have a historical average number of home runs per game, average number of walks, an earned run average, average number of strikeouts per game, or the like. The statistics can include, for example, player performance averages, scoring histories, current ("real-time") scores, player salaries, statlines, or the like. Statlines can also include player statistics specific to a particular sport and can include, for example, home-runs, batting averages, or the like.

The primary data 120 can also include any data provided by the host or provider 112 of a virtual competition. The primary data 120 can include, for example, a player value for at least one player, a maximum amount that the total of the player values for a lineup cannot exceed, a player value representing the performance of the players, or the like. The player value can represent the current value of the player and can be an amalgam of many factors that together determine the value of the player in some virtual competition system. The player value can be, for example, a point value, a salary, a "worth," or the like.

In one implementation, a location of an upcoming event and location statistics can be retrieved from the first data provider 112. The location statistics can correspond to the performance of the player during prior events at particular locations, such as stadiums, venues, courts, golf courses, or the like. The player performance at the prior locations can be used in the calculation of the projected value of the player when prior player performance data is available for the same location.

The secondary data 122 can include data relevant to the players or to upcoming competitions, for example, predictions, locations of upcoming events, box scores, Vegas odds, player injury histories, rosters, schedules, salaries, lineups, or the like. This secondary data 122 can be received from or scraped from, for example, other computing systems, websites, or data feeds and used to modify a projected value of a player in an upcoming event, as described further herein.

In some implementations, the secondary data provider can supply a prediction for how many points (or other performance metric) a player is expected to earn. Such predictions can be used in any combination or aggregated to provide an additional factor or constraint to the automated projection engine 140 when computing a projected value or determining an optimal lineup.

In another implementation, matchup statistics can be retrieved from the second data provider 114. The matchup statistics can correspond to the performance of the player during prior matchups against a specified opponent or team. The player performance during the prior matchup can be used in the calculation of the projected value of the player when prior matchup performance data is available for the same opponent or team.

The tertiary data 124 can include, for example, data relating to the environment that the player is going to be playing in during an upcoming competition. Tertiary data 124 can include, for example, weather data, weather statistics, or the like. Weather data can correspond to predicted weather conditions at a particular location during a future event that includes the player. Weather statistics can correspond to the performance of the player under prior weather conditions similar to the predicted weather conditions. In one implementation, the future game can be the next game that the player will play and the tertiary data 124 can be specific only to the next game. Such a situation particularly applies to weather data, which is difficult to forecast far into the future.

In general, implementations of the described subject matter can incorporate the most up-to-date primary data 120, secondary data 122, and tertiary data 124, for the players and their respective upcoming events. These implementations can be distinct from, for example, seasonal lineup assemblies. Here, at least a portion of the primary data 120, secondary data 122, and tertiary data 124 used for determination of projected values can correspond only to the upcoming event for the player, and not to additional events subsequent to the upcoming event.

In other implementations, the features described herein can be applied across weekly or seasonal timeframes. For example, when location data is available for a whole season, location factors can be applied when determining projected values for the players. Similarly, weather data can be applied based on long-term forecasts or historical trends for weather at a given location.

Any of the collected data can be parsed, sorted, transformed, or the like, to a more readable format. In one implementation, data received or scraped from a website can be HTML page code. The HTML page code can be parsed to extract the relevant data, statistics, or the like, and not include information such as page formatting code, tags, metadata, or the like. The parsed data can then be sent to the automated projection engine 140 in a format that can be ingested to generate projected values as described herein.

The automated projection engine 140, using the primary data 120, secondary data 122, tertiary data 124, or the like, can modify the values for the players to provide a more accurate projected value of the players. In one implementation, the player can be represented as an internal object 142 with an associated projected value in an upcoming event. The projected value can be determined by the automated projection engine 140 taking into account the primary 120, secondary 122, and tertiary data 124.

A player can be represented by an internal object, stored at the server 130, and modifiable based on additions or changes to any of the received data. The internal object 142 can be, for example, an "object" in the sense of those used in object-oriented programming languages, a table, an array, a spreadsheet, a text file, or the like. The examples given herein generally refer to the internal object 142 as being of the type used in object-oriented languages. These internal objects 142 can have attributes that can represent a particular statistic or feature of the player. For example, an internal object 142 can have a "home runs" attribute, an "times-at-bat" attribute, a "salary" attribute, a "base value" attribute, a "projected value" attribute, or the like. These attributes can be modified, queried, or the like. In some implementations, an attribute can be static, such as handedness, gender, or the like. As such, the attributes can correspond to at least a portion of the set of statistics, the limiting factor, and the weather conditions.

In some implementations, a "base value" attribute can be added to the internal object 142 to represent a value of the player based on statistics or other historical information. The base value can be supplied by a data provider, for example a system running a virtual sports competition. In other implementations, the base value can be assigned based on, for example, an average number of points earned per game, an average or current ranking, or the like.

To modify the values of the players, there can be a mapping function 146 which applies modifiers 144 to appropriate elements the player attributes. The modifiers 144 can be based on at least a portion of the primary data 120, secondary data 122, and tertiary data 124. For example, in some situations, a player's performance may have no correlation whatsoever with the weather conditions. One example of such would be players of indoor sports. As such, the weather data component of the tertiary data 124 would not map to the statistics for the player. Another example can be the relationship between wind speed and golf performance. A player's golf performance is expected to be better either under no wind or under a favorable wind which carries the ball further. Because of this known relationship, there can be a mapping that allows the tertiary data 124 to be combined with the statistics to modify the value of the player. This is particularly advantageous in virtual competitions where, unlike real competitions, the players are often not competing under the same conditions. For example, two otherwise evenly matched players, which may have identical values, can in fact have very different projected values based on the conditions under which they are each competing. The mapping function 146 can be used to determine which elements of the secondary data 122 and tertiary data 124 are relevant to modifying the player value.

In one implementation, a projected value can be generated from the base value by first applying a modifier 144 to another attribute, for example a player stat, according to the prescribed mapping. As one example, an estimate of a number of home runs per game can be modified up or down based on weather conditions. Then, a rule can be applied that converts the modified attribute to a projected value. The rule can be received from a data provider, for example, one that hosts a fantasy sports contest. One example of a rule can be that a home run is worth a given number of points in their particular fantasy sports contest. This can be done for any number of stats or attributes and the projected values (e.g. expected number of points) for one or more players in the lineup can be summed or otherwise used as factors to determine the final projected value of the player.

For example, if the secondary data 122 suggests that a particular player has performed well in a given stadium, and if that stadium is the same as the one that the player will next compete in, then a positive modifier 144 can be determined and applied to the value of the player. In this way, rather than relying on a long-term average of performance, which may not be representative of a particular contest, specific factors can be taken into account that are directly relevant to a specific upcoming competition. By applying these modifiers 144 to the base values, a projected value can be generated. One example of the calculation of the modifiers 144 and the projected value is further described in the discussion of FIG. 3.

In one implementation, the automated projection engine 140 can update the modifiers 144 (and the projected values) based on monitored changes to any of the primary data 120, secondary data 122, or tertiary data 124. For example, the player statistics at the first data provider 112 can be monitored. When a change to the statistics is detected, for example when a player's batting average changes, the automated projection engine 140 can update the projected value of the player. In some implementations, an indication of the monitored change can be transmitted to the mobile application 160. The indication can be, for example, a graphical or audio alert, an email, a command to vibrate the mobile device, or the like.

The automated projection engine 140 can query appropriate data sources for updated historical statistics and/or venue data 160. The query can be automatic or as a result of a command from a user. The command can be through a mobile application 160 interfaced with the server 130, or through another computing device. In another implementation, the automated projection engine 140 can update the modifiers 144 based on accumulated data, simulations, archived data of results using projected values, or the like. Here, the automated projection engine 140 can access data from a large number of sources automatically to update the modifiers 144 122, something that is impossible for a human to perform. Libraries of past results and algorithms can be stored for reference by the automated projection engine 140 and used instead of, or in addition to, the types of data present in the primary data 120, secondary data 122, and tertiary data 124. The automated projection engine 140 can use machine-learning techniques, neural networks, or the like, to implement a continuous and automatic improvement of the calculation of the modifiers 144 to provide more accurate projected values.

Based on the projected values of the players, the automated projection engine 140 can generate a lineup including one or more players represented by the internal objects 142. The lineup can be a set of pointers to specific internal objects 142, an array of internal objects 142, a list of unique identifiers for the internal objects 142, a table or file containing data corresponding to the internal objects 142, or the like. However, as previously discussed, for example, with a "daily" fantasy sport there is often a limit to the total limiting factors of the players that are allowed to make up a lineup. The automated projection engine 140 can determine the lineup that results in the maximum projected value of all the players in the lineup while remaining within the constraints of the a maximum factor, for example, a total dollar amount for player salaries. As one example, there may be a particular player who has a very high value. While desirable as a player, this particular player may also have a limiting factor so high that the remainder of the amount of limiting factors that can be used for the lineup would force the remainder of the lineup to be very poor, resulting in an overall poor lineup. In some cases, the optimum lineup is provided by not choosing the best players, but rather by choosing a balanced lineup. In this way, the automated projection engine 140 can generate an optimized lineup that is a combination of players that result in the highest number of points possible with any combination of players. This example of constrained lineup generation can be described as, for example, a first constraint where a sum of the limiting factors of the internal objects 142 making up the lineup does not exceed a maximum factor. There can also be a second constraint where the sum of the projected values of the lineup is maximized, subject to the first constraint.

By applying the modifiers 144 as discussed herein, not only is the lineup optimal in terms of value versus limiting factors, but it can be naturally optimized specifically for the upcoming competition. Accordingly, an optimal lineup in one competition may not be an optimal lineup in another competition even if all of the players (both selected by the user and their opposition) remain the same. For example, weather, venue, injuries, or the like, can change over a short span of time. The process of providing an optimal lineup is described further with regard to FIG. 3.

In another implementation, the user can specify a preference for one or more players to be included or excluded from the lineup. For example, a user can specify, for example through the mobile application 160, that they would like a particular player from a particular team to be in the lineup, or that as many players as possible from a favorite real team are in the lineup. The preference can be implemented in the automated projection engine 140 as a preference weight. For example, the preference weight can be a numerical range between 0 and 1, with 0 indicating that the particular player will never be selected for the optimal lineup and a 1 indicating that the particular player will always be selected for the optimal lineup. However, when the sum of the limiting factors of the players in the lineup exceeds the maximum factor, one or more of the players causing the violation can be excluded from the lineup. When generating the optimal lineup, if the preferences expressed by the user cause the optimal lineup to exceed the limiting amount, or violate any other rules, then a warning or other message can be provided to the user. Other representations of the preference weight can be established, for example, as a probability, weightings attached to certain player characteristics or statistics, or the like.

Once generated, the lineup or list of internal objects can be transmitted to a computing device, for example, a website, smartphone, server 130, or the like. In one implementation, the lineup or list can be provided to a mobile application 160 running on a computer or mobile device. The lineup or list can be in the form of a listing of players represented by the internal objects 142. In other implementations, the automated projection engine 140 and the computing system 130 can be on the same or different computing devices, for example mobile devices, laptop computers, desktop computers, or the like. The user can view, modify, or approve the provided lineup. In another implementation, the lineup can be deliberately sent by the user, or automatically transmitted to the data provider, for implementation in the virtual competition staged by the data provider or host of a fantasy sports game. Equivalently, the data provider or mobile application 160 can send a request to the server 130 running the automated projection engine 140 resulting in a pull operation to request a lineup on the user's behalf. For example, a user can utilize the automated prediction engine 110 to generate a lineup that is automatically exported to the provider, for example, DRAFTKINGS™, FANDUEL™, or any other fantasy sports website.

Figure 2:
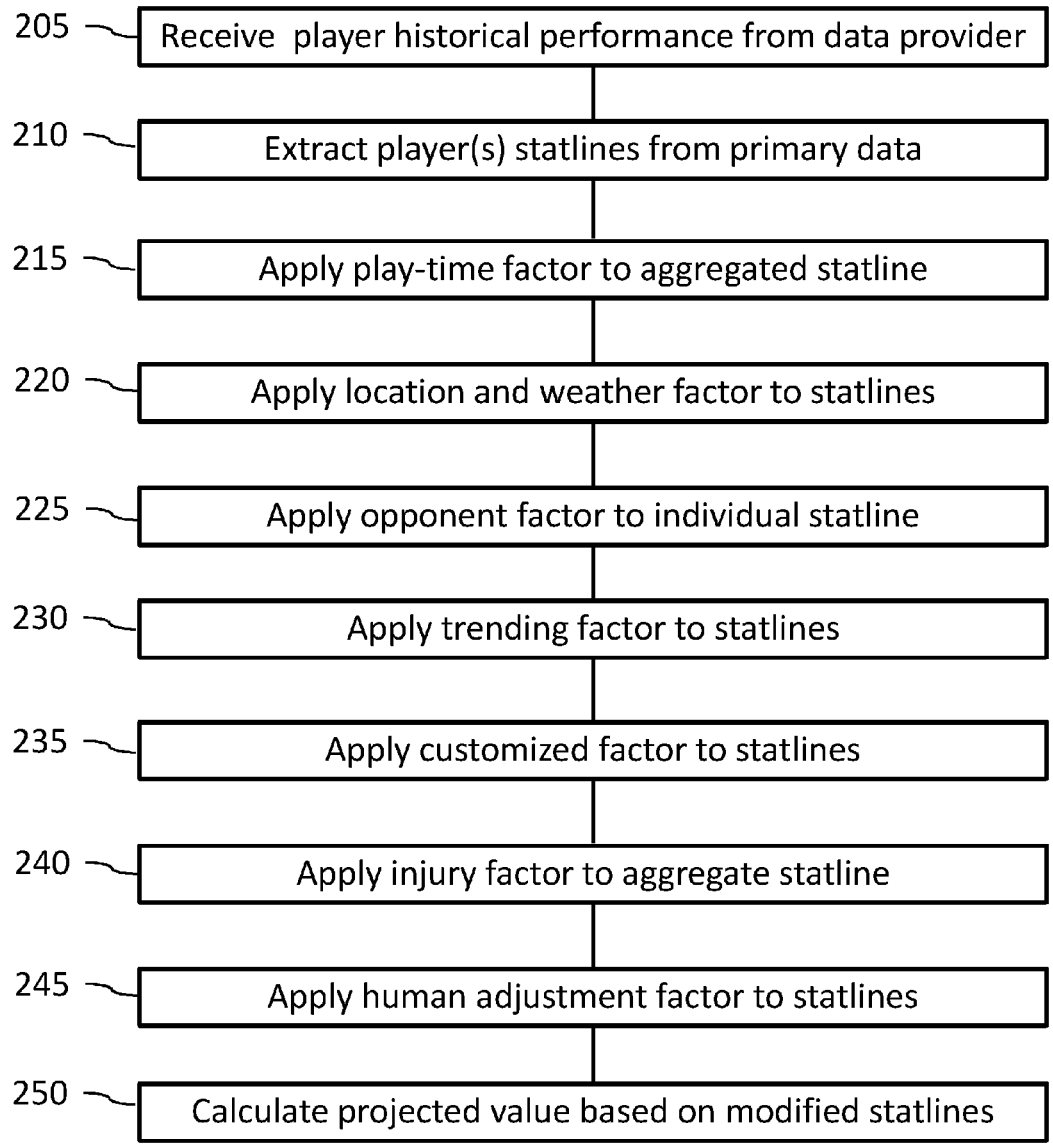
FIG. 2 is an exemplary process flow diagram illustrating the calculation of a projected value in accordance with certain aspects of the present disclosure.

FIG. 2 is an exemplary process flow diagram illustrating the calculation of a projected value in accordance with certain aspects of the present disclosure. To provide a somewhat more specific example of the processes described herein, FIG. 2 presents a sequence of steps that can be executed by the automated projection engine 140 when modifying a value of a player to generate a projected value of a player for an upcoming baseball game At 205, a historical performance, such as statistics of the player, can be received from a data provider. For example, the historical performance can be part of primary data 120 received from the first data provider 112.

At 210, the player's statline can be extracted from the primary data 120. Multiple statlines can be collected for a given player, for example over a specific number of prior games, for example the last 50, last 20, last 10, or the like. The statline for a single event can be referred to as an individual statline. The collection of statlines (all corresponding to the same player) can be referred to as the aggregate statline.

At 215-245, factors are applied to the statlines to modify them based on the particulars of the upcoming event, for example, location, opponent, weather, or the like. The examples given below describe only a few of the factors that can be applied as modifiers 144 to a statline.

At 215, a play-time factor can be calculated and applied to the aggregate statline (i.e. to all individual statlines). The play-time factor can be, for example, the number of plate appearances divided by the expected number of plate appearances. Here, if a player had half as many plate appearances as expected based on the team size, then the play-time factor would be 0.5. Also, if the player is expected to play for a different length of time during an upcoming contest compared to their past play times, the play-time factor can be determined to reflect the upcoming play time. For example, if the projected value for 40 minutes of play time was desired, but the player typically plays for 15 minutes, the play-time factor would be 40/15 or 2.66.

At 220, a location factor and a weather factor can be calculated and applied. The location factor can modify certain stats of the player based on the particular location they are playing at. For example, a statline can have an average number of home runs at a given location, e.g. their home stadium. If the home stadium had a home run factor of 0.938 (harder to get home runs) compared to the upcoming location which has a home run factor of 1.36 (easier to get home runs), then the location factor would be 1.36/0.938=1.45. A weather factor can be a modifier 144 that is applied to the aggregate statline factors. The weather factor influence on a stat can be considered to be independent of where the game took place or any other factors.

At 225, an opponent factor can be calculated and applied. The opponent factor can include, for example, a left/right split. When the player is facing a starting lefty starting pitcher, then the collective individual statlines can be weighted so that, for example, 80% of the aggregate statline is representative of the player's performance against lefties and the other 20% represents the player's performance against righties. This can be done by, for example, calculating two sets of multipliers. One multiplier applies to all lefty-based statlines and one to apply to all righty-based statlines. The 80%/20% weighting is only one option, for example, the weighting could be 70%/30%, 90/10%, or the like.

At 230, a trending factor can be calculated and applied. If more recent performances are valued, a first (least recent) fraction of the statlines can be reduced by a first factor and a second (most recent) fraction of the statlines can be increased by a second factor. For example, the least recent 5%, 10%, 25%, or the like of the statline can be multiplied by, for example, 0.5, 0.75, 0.9, or the like. Similarly the most recent 5%, 10%, 25%, or the like of the statline can be multiplied by, for example, 1.5, 1.25, 1.1, or the like.

At 235, a customized, experimental, or miscellaneous factor can be calculated and applied. For example, if it was determined through statistical analysis that an individual statline or aggregate statline should be modified to provide a more accurate projected value, then a factor can be applied to adjust them.

At 240, an injury factor can be calculated and applied. For example, if a players home run performance is known when playing with a sprain, then when a data provider provides an indication that the player is injured, an injury factor can be applied to the aggregate statline to better represent their predicted performance.

At 245, a human adjustment factor can be calculated and applied. For example, the human adjustment factor can be a user-defined factor to apply to the aggregate statline. In another implementation, the human adjustment factor can be a direct stat replacement. Here, all other factors that modify the stat can be set to 1.0 and the number of games can be equivalently set to 1.0.

At 250, all of the factors can be applied as described above and used to calculate a projected value based on the modified statlines.

In another implementation, player stats can be extracted from the primary data 120 and categorized in terms of player vs. opponent characteristic. For example, for baseball, there can be three main categories. A) pitcher vs. hitter history, B) hitter vs. pitcher handedness, and C) pitcher vs. hitter's handedness.

Stats can be selected from each main category based on their ability to impact the player's point total. This selection can be, for example, set in the automated projection engine 140 or received by a user of the mobile application 160. In this example, pitcher categories can have (wOBA, ISO, HR/PA, and kRate) as relevant stats. Similarly, batter categories can have (Avg, wOBA, ISO, HR/PA) as relevant stats.

TABLE 1

Example point modifier 144 for outlier performance

| | |
|---|---|
| <1 Std. Dev. | −1.5 points |
| −1 to −0.5 Std. Dev. | −1.0 point |
| −0.5 to 0.5 Std. Dev. | 0 points (no modifier 144) |
| 0.5 to 1.0 Std. Dev. | +1 point |
| >1.0 Std. Dev. | +1.5 points |

As shown in the example of Table 1, the stats can be compared against league averages, for example received from the primary data 120 source, to determine where the player is relative to the other league players. Based on how many standard deviations the player is away in a particular stat, player value can be increased or decreased.

These additions to the projected value can be applied through the mobile application 160 or by the automated projection engine 140 instead of, or in addition to, the other methods for computing a projected value described herein.

Figure 3:
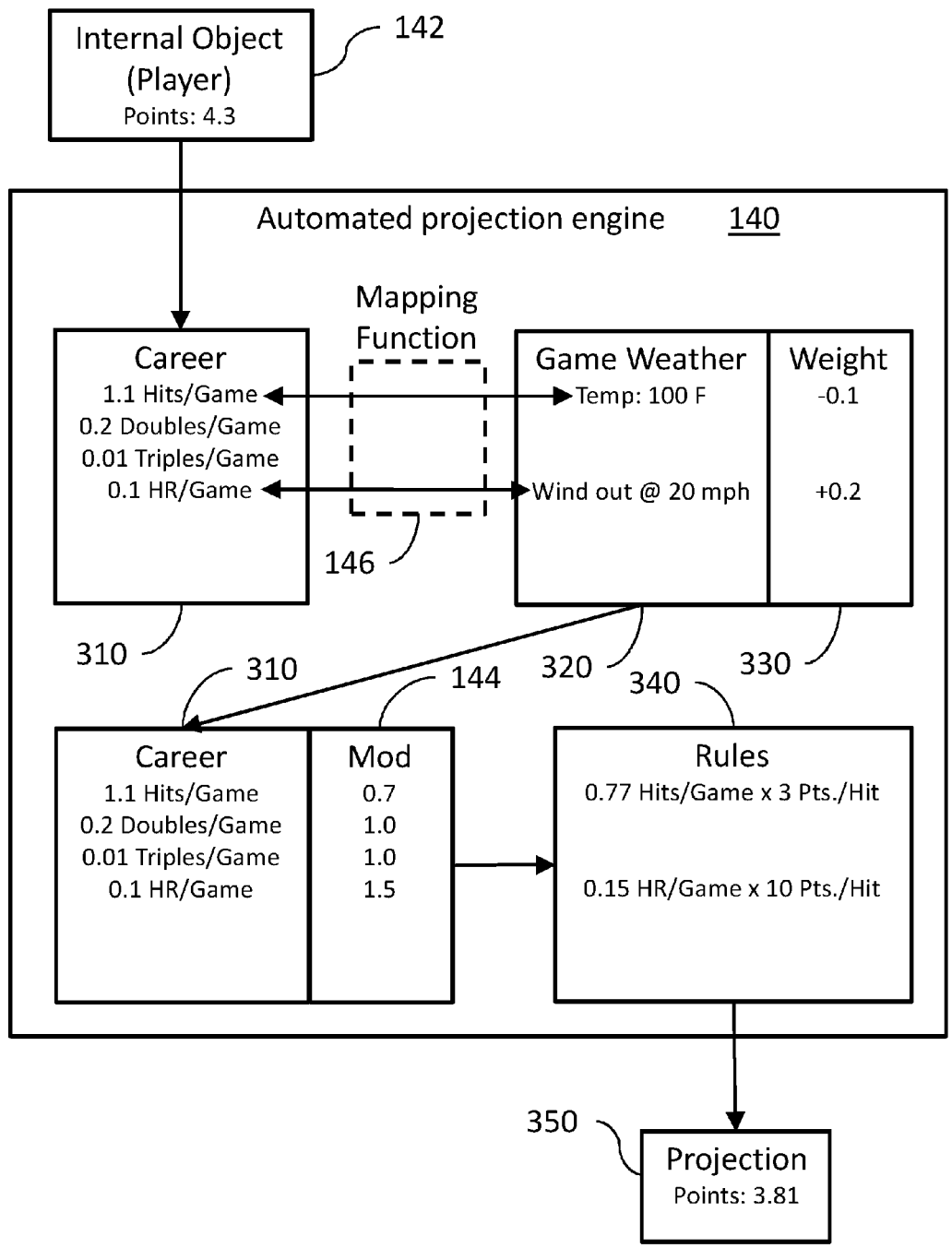
FIG. 3 is a diagram illustrating an exemplary operation of the automated projection engine in accordance with certain aspects of the present disclosure.

FIG. 3 is a diagram illustrating an exemplary operation of the automated projection engine 140 in accordance with certain aspects of the present disclosure. This provides a more specific example of the method of calculating the projected value based on calculating and applying modifiers 144 to player stats. In the example shown by FIG. 3, the value of the player (represented by the internal object 142) is input into the automated projection engine 140. In this example, the player is assigned 4.3 points which can represent, for example, the number of points that player is expected to obtain in a particular competition, the number of points assigned by a data provider 110, game server, or the like. The automated projection engine 140 can then map, with the mapping function 146, some of the primary data 120 for the player to the secondary data 122 and tertiary data 124. Here, the primary data 120 includes, for example, career stats 310 such as hits, doubles, triples, and home runs, per game. In this case, the tertiary data 124 includes only two items of weather data 320, the temperature and the wind speed. Alternatively, other weather data 320 can be used such as precipitation type, barometric pressure, elevation, high or low pressure systems, humidity, or the like. The automated projection engine 140 can apply a weight 330 for each of the weather statistics that can be unique to the player. The weight 330 can be based on historical data, for example, calculated deviations in player performance under similar conditions. In this example, for this player, the high temperature provides a small negative modifier 144 to the expected number of hits per game. Also, the favorable wind conditions provide a modest positive modifier 144 to the expected number of home runs per game. Thus the condition can be expressed as a favorable or unfavorable modifier 144 by setting of the sign of the weight 240 or other factor that goes into calculating the modifier 144.

The automated projection engine 140 can use these weights 330 as part of an algorithm or function (f) to determine a modifier 144 to the base value. In one implementation, the modifier 144 can be a function of (i) the weight 330, (ii) a maximum amount for the modifier 144, and (iii) a threshold value for the condition that governs the modifier 144. Thus the modifier 144 can, in as one example, be represented as $$Mod=1+weight*f(condition, Max\ mod, threshold). \quad (1)$$

The condition can be, for example, wind speed, temperature, elevation, or the like. The weight 240 is described above and generally affects the ability of the condition to impact the player statistic represented by the historical data.

The maximum modifier 144 sets a limit to which the historical data can be affected. For example, if the maximum modifier 144 was set to 1, then the total modifier 144 could not exceed 1+1 or 2. Thus no matter what conditions were present, the total modifier 144 could not go below 0 or above 2. The threshold value can describe the condition that must be exceeded for a modifier 144 to be calculated. This threshold value can be based on a statistical analysis of historical data to determine a cutoff point at which the statistic exhibits little or no change. Multiple factors can be applied to each statistic. In some implementations, for example, the home runs/game can be modified by both wind and temperature.

In another example, such as in the sport of football, it may be determined that the wind did not affect a particular player passing performance unless it was over 25 mph. In this case, the threshold value for the wind would be 25 mph. and no modifier 144 would be applied if the wind was below that speed, regardless of what weight 330 was specified. Conversely, there can be a maximum in which player performance was affected, such as 50 mph, such that regardless if the wind is higher than 50 mph (for example if it is 60 mph, 75 mph, or higher), the effect on the player is the same and the modifier 144 is thus capped once the weather condition reaches that threshold.

Returning to the example of FIG. 2, it is determined, for example by the function of Eq. 1, that the hits per game should be modified by a factor of 0.7 whereas the home runs per game should be modified by a factor of 1.5. The weighting 330 was taken into account when determining the final modifier 144 to the stat. The doubles and triples per game were not affected by the game weather and hence their modifiers 144 remain 1.0. Once the modified stats for the player have been computed they can be applied to rules 340 of the virtual competition as dictated by the provider 112. In this example, the provider 112 has determined that a hit is worth 3 points and a home run is worth 10 points. Based on the modified attributes and the rules 340 from the provider 112, a projected point value 260 is calculated to be 3.81. Comparing the projected point value 350 of 3.81 to the original point value of 4.3, the automated projection engine 140 predicts that the player will perform worse than expected. Such a determination can result in a more accurate determination of the optimal lineup.

Figure 4:
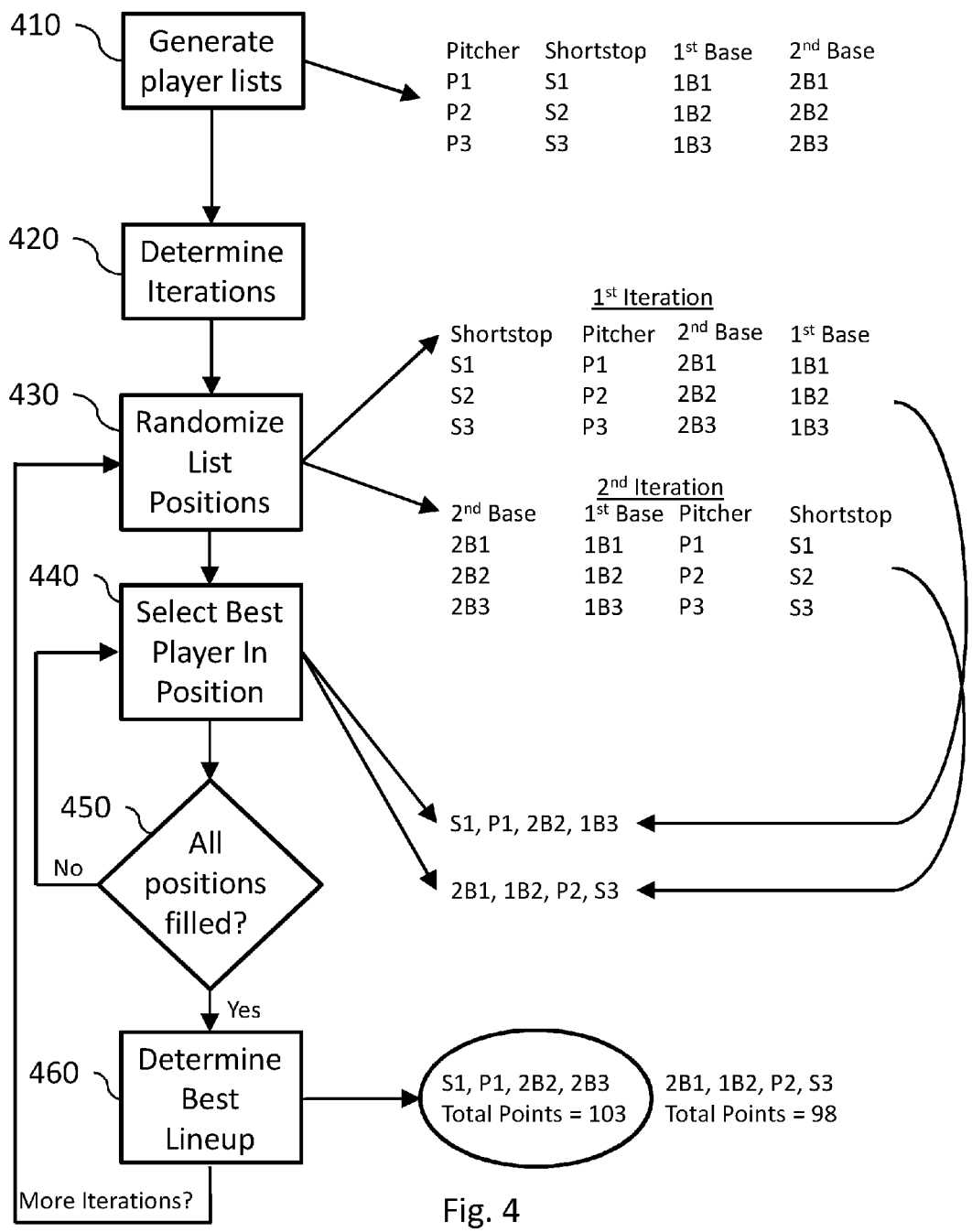
FIG. 4 is a process flow diagram illustrating an exemplary method of generating an optimal lineup in accordance with certain aspects of the present disclosure.

FIG. 4 is a process flow diagram illustrating an exemplary method of generating an optimal lineup in accordance with certain aspects of the present disclosure. The generation of an optimal lineup is a constrained optimization problem that must conform to the limiting factor and other daily rules. On the left side of FIG. 4 is a process flow diagram illustrating actions taken by the automated projection engine 140 to generate the lineup. On the right side of FIG. 4 are examples of player types and rankings to illustrate the described process.

At 410, player lists can be generated that describe, for each position or player type, a list of eligible players for a lineup. The players can be selected from any collection of players, for example, those with projected point values as described in FIG. 3, imported from another computing system or player database, or the like. The list can include, for example, a pitcher, shortstop, $1^{st}$ baseman, $2^{nd}$ baseman, or the like. Each type of player can include several players, ranked according to their projected point value. Pitchers, for example, can be ranked P1, P2, P3, in descending order of projected point value. Shortstops can be ranked S1, S2, S3, etc. Other player types can similarly be ranked into player lists.

At 420, a number of iterations can be determined based on the size of the player lists. In one implementation, the number of iterations can be inversely proportional to the size of the player list in order to maintain a relatively constant computational time.

At 430, the player list can be randomized according to player type. Two examples are shown corresponding to two iterations of the described process.

At 440, in order of the current player list, for each player type, the highest ranked player available is selected, subject to the constraints of the limiting amount, or other rules. In the example given, for the first iteration, the best shortstop (S1) is chosen.

At 450, because all positions in the lineup have not been filled, the process continues with 440 for the next position. Here, the best pitcher (P1) is chosen. The process continues with choosing of the $2^{nd}$ baseman. However, in this example, we assume that the best $2^{nd}$ baseman cannot be chosen because it violates some constraint, so the $2^{nd}$ best $2^{nd}$ baseman (2B2) is chosen. Similarly, the best $1^{st}$ baseman available is 1B3. Thus the lineup for the first iteration is S1, P1, 2B2, and 1B3.

At 460, the lineup can be recorded and a total projected point value for the lineup determined. The process can then restart at 430 to generate a lineup for each iteration, with each lineup compared to the best prior lineup to determine a final optimal lineup. In the example given in FIG. 4, the second iteration results in a lineup of 2B1, 1B2, P2, and S3. In this example, it is determined that the first lineup is better than the second, so the first lineup remains the optimal lineup.

Figure 5:
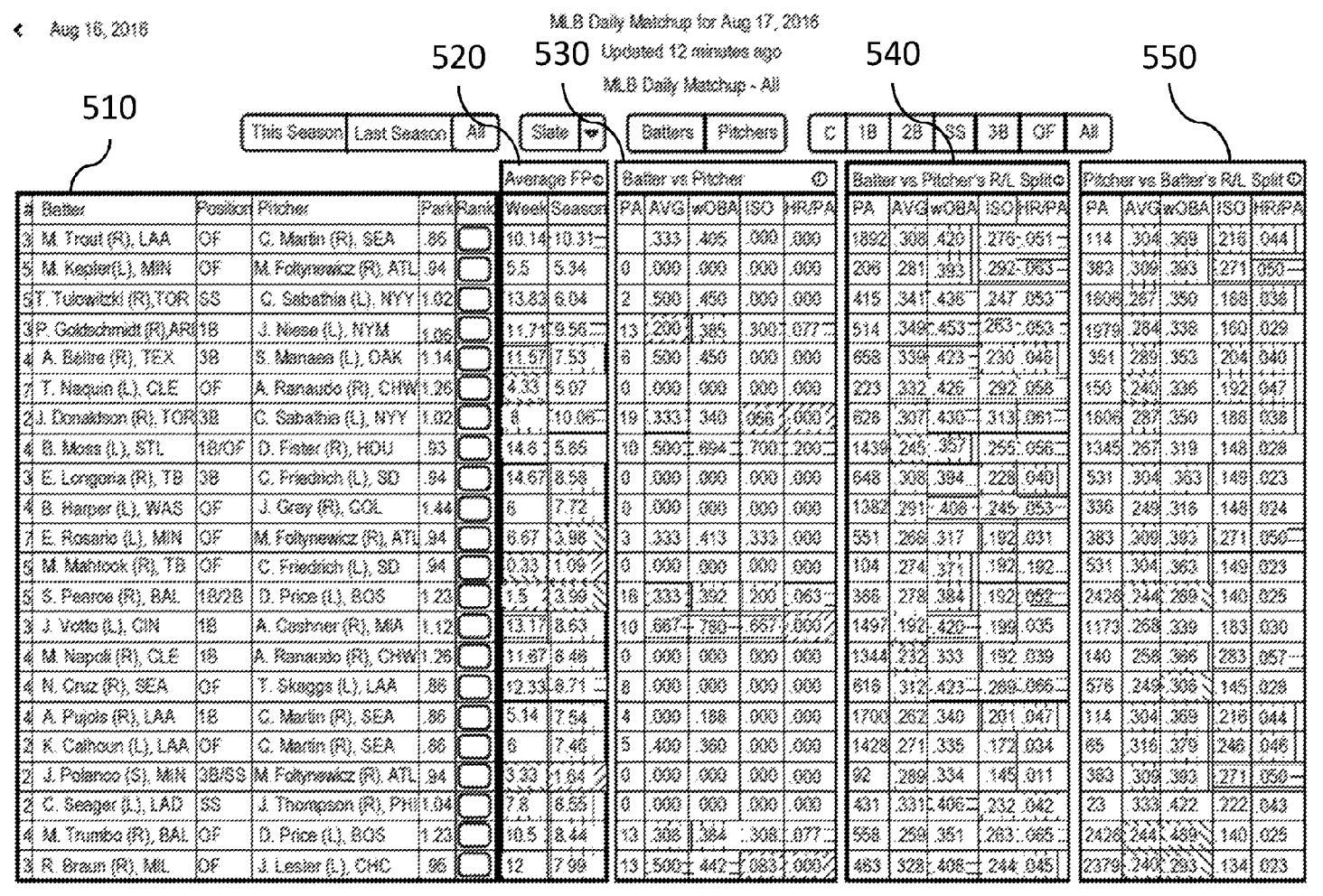

FIG. 5 is a screen capture illustrating matchups between competing players in accordance with certain aspects of the present disclosure. A graphical display, for example on a mobile device or other computer, can show a detailed comparison between competitors to aid a user in selecting players to be part of the desired lineup. The example shown in FIG. 5 applies to baseball. There can also be tables 510 describing the matchup between two competing players or teams, here for example the batter and pitcher. For each matchup, several tables of data can be displayed according to categories, for example, a location factor "Park" 520, "Average FP" (Average Fantasy Points of the batter) 520, "Batter vs. Pitcher" 530, "Batter vs. Pitchers R/L Split" 540, and "Pitcher vs. Batters R/L Split" 550, or the like. The example table shown incorporates many of the features discussed with reference to FIG. 2 and Table 1. In particular, the table entries can be color-coded or otherwise visually rendered to reflect the statistical deviation of the displayed stat when compared to league averages. In FIG. 5, they are shown as different cross-hatchings to indicate whether a stat is favorable or unfavorable, and by how much. For example, the average value for the matchup between M. Trout and C. Martin indicates (by the horizontal hatching) that the M. Trout's weekly averaged value is 1 standard deviation greater than the league averaged over the same week. Similarly, M. Mahtook's weekly averaged value (by the angled hatching) is 1 standard deviation less than the league average over the same week.

Figure 6:
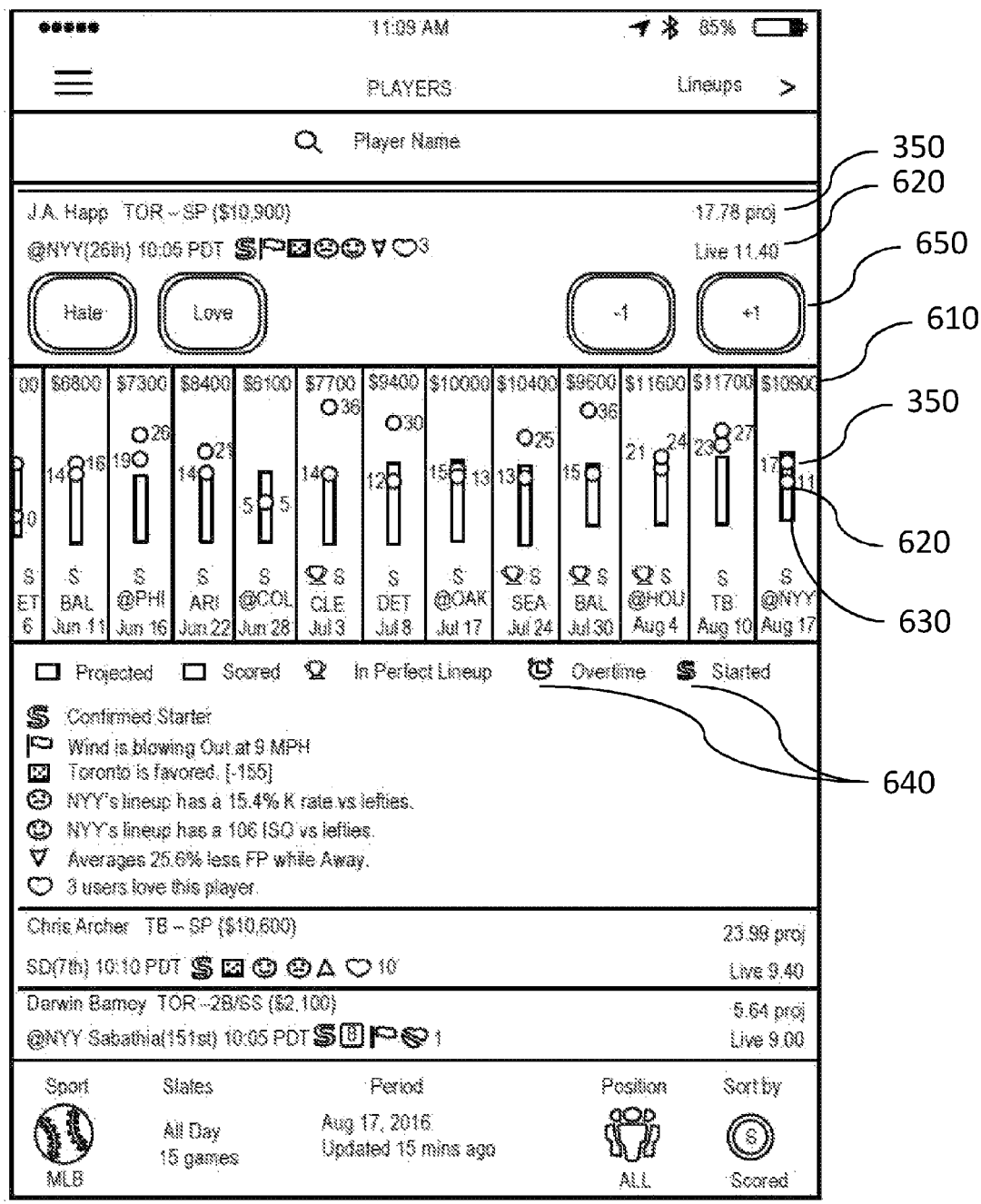
FIG. 6 is a screen capture illustrating providing the recent history of player information to a graphical user interface on a mobile device in accordance with certain aspects of the present disclosure.
Figure 7:
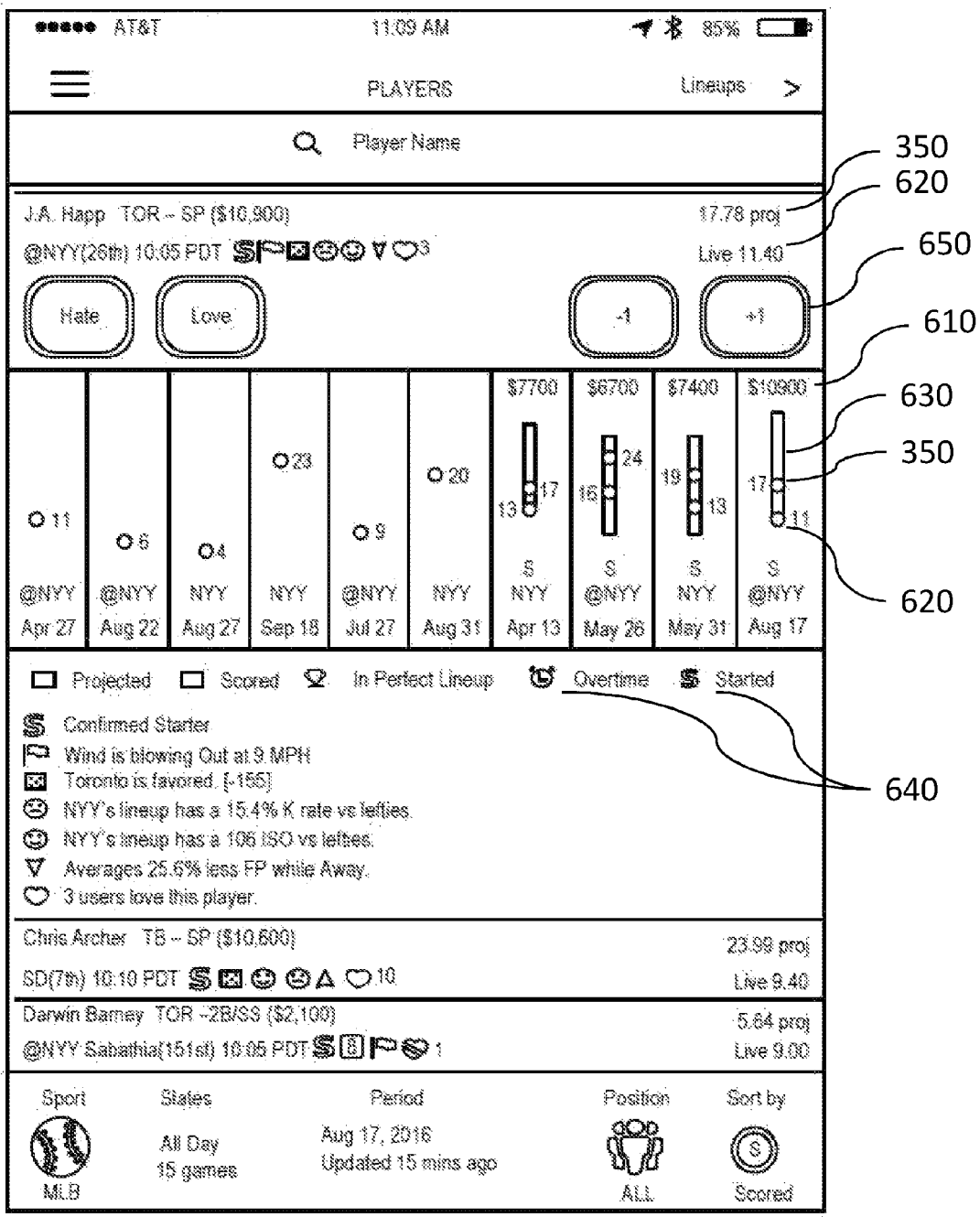
FIG. 7 a screen capture illustrating providing the athlete's history vs a team playing on the current day to a graphical user interface on a mobile device in accordance with certain aspects of the present disclosure.

FIG. 6 is a screen capture illustrating providing the recent history of player information to a graphical user interface on a mobile device in accordance with certain aspects of the present disclosure. FIG. 7 a screen capture illustrating providing the athlete's history vs a team playing on the current day to a graphical user interface on a mobile device in accordance with certain aspects of the present disclosure. In FIG. 6, the screen capture shows, for example, the player's limiting factor 610, in this case expressed as a salary, at each game. It also shows the players actual (live) points 620 vs. the projected point value 350. The projected point value 350 can be generated to fall within vertical bands 630 which can represent a floor for the projected point value 350 and a ceiling for the projected point value 350. The actual points, for example, in terms of fantasy points, can be collected over a given historical window. The actual points have an average and a standard deviation. The length of the vertical band can correspond to the difference between the floor (−1 standard deviation) and a ceiling (+1 standard deviation) of the player's expected points based only on the historical performance. The projected point value 350 and the actual points can be shown for comparison, where available.

Additional information can also be displayed on the graphical user interface, for example, icons 640 or other graphical representations of particular aspects of the player, the upcoming event, or the like. These aspects can include, indicating that the player is in a starting lineup, making it very likely that they will in fact be played, that the player is favored or disfavored against their current opponent or team, that the weather conditions are particularly favorable or unfavorable for the player, whether or not the player is on a hot or cold streak, indicating a likely trend to continue, whether they were in the best possible combination of players the day before, if they had an overtime period, if they left with an injury, or the like.

In another implementation, the user can alter or override the projected points (shown by the −1/+1 buttons) 650. Once altered, the altered projected points can be used to generate another optimal lineup according to any of the methods described herein.

In another implementation, the user can select, via the graphical user interface, to receive notifications of recent changes to, for example, the primary data 120, secondary data 122, tertiary data 124, or the like. One example of a notification can be if a player hit a home run in a game, and if the player was on a list of players the user had selected to receive notifications about, then the user would receive a notification indicating the event. Such a notification can be, for example, displayed in the graphical user interface, or as a message, text, image, email, or the like sent to another computing device.

The location where each event occurred can be shown and can be color-coded to characterize a difficulty in the matchup. For example, the difficulty can be represented by a statistical deviation in the performance of that player vs. that team alone, as compared to the league. In one implementation, the graphical display (FIG. 6) can transition to a graphical display (FIG. 7) showing an athlete's history vs a team playing on the current day. There can be additional screens that can display, for example, a selection of stats averaged over a specified time range, a crawler or newsfeed of news stories relating to the player as received from any of the data providers, or the like.

Figure 8:
FIG. 8 is a diagram illustrating providing live scoring to a graphical user interface on a mobile device in accordance with certain aspects of the present disclosure.

FIG. 8 is a diagram illustrating displaying live scoring on a graphical user interface of a mobile device in accordance with certain aspects of the present disclosure. Live scoring can display the up-to-date scoring progress of the player during an event or a specified scoring period. The up-to-date score can be compared to the projection to see how close the player is to their projection, at that point in time.

In one implementation, the server 130 can receive, from at least one data provider, an electronic indication that a change has been made to the data received from the data provider. This can include changes to any or all of the primary data 120, secondary data 122, or tertiary data 124. The electronic indication can be, for example, a notification for a push or pull operation to result in the transmission of an updated status of a player to the server 130, an electronic alert that an update in the primary data 120 has occurred, detection of a change to a posted stat or a description of an contest or player being monitored on a website, or the like.

The change can be representative of an instant event 830 that occurred in a game in which the player is currently participating. For example, in baseball, the instant event 830 can be hits, home runs, walks, strike-outs, injuries, lineup changes, weather changes, or the like. The change can be reflected in stored tables, displayed graphical or textual information on websites, or other data storage that includes a current status of the player or the game in which the player is participating.

In some implementations, the data provider 110 can be monitored, by the server 130, the mobile device, or other computing system, for the change. In one implementation, when a change is detected, a request can be transmitted to the data provider 110 for information about the change. The request can be for the name of the player, other statistics about the player, the event that just occurred, the time at which the event took place, or the like. In other implementations, the change in the primary data 120 can be communicated from the data provider 110 to the server 130 or to the mobile application 160 without waiting for a request for update. In yet another implementation, the change can be determined by monitoring the data provider 110, for example, by the scraping of publicly posted or otherwise available data provider information.

Events can be automatically identified and tagged by the server 130 as being a particular type of event. The server 130 can monitor for updates posted to a public website or received from a data provider 110. The update can include information in a textual format or in the form of metadata that can be interpreted by the server 130 to identify the event. As one example, on a football tournament website an update could be posted as "Joe Smith scored a touchdown at 2:59 PM." The server, monitoring the website, can scrape that text string and parse it to extract the player, the type of event (e.g. a touchdown), and the time of the event. The parsing can include, for example, string-splitting, machine-reading, image-recognition of scraped icons/images, lookup of standard abbreviations, characters, or symbols associated with events, players, or the like. As another example, if the update included "Joe Smith threw a 45 yard pass to Bob Jones at 10:30 AM," both players can be extracted from the event and associated with the same event.

Such an association can be combined with the rules that determine the value of a player, lineup, or the like, being monitored by the server 130. In the example above, the rules can determine that Joe Smith throwing a completed pass is worth, for example, 5 points. Similarly, the rules can also determine hat Bob Jones receiving the pass is worth, for example, 3 points. In some implementations, multiple rule sets can be applied to the same event and ultimately presented to a user. If data provider A had a rule that the pass was worth 5 points and data provider B had a rule that the pass was worth 8 points, both changes can be displayed for the single event. Other types of rules can be applied as determined by a user or a data provider. For example, even if an event was not a scoring event it can be tagged as a particular type, such as a "BIG PLAY," or other type of event when a pre-determined play metric is determined to be satisfied from parsing the received update.

The tagging can allow implementation of filtered events to be displayed at the mobile device, or other computing system, when showing live scoring. The mobile application 160 on the mobile device can be configured automatically, or by user input, to specifically display the change associated with tagged types of events in the user-interface of the mobile device. For example, when the mobile application is configured to display events specific to a lineup, it would only display the events for those players in the lineup. If Joe Smith was in the specified lineup but Bob Jones was not, then only the update to the points for Joe Smith would be displayed.

The change can be reflected in a graphical display at the mobile device running the mobile application 160. In some implementations, the rules that govern a particular game provider can be applied to include the change in the primary data 120 for calculating a current score for the player. The current score can then be transmitted to the mobile application 160 for display at the mobile device. In some implementations, a user can determine which data provider to use for applying a particular set of rules. The current score under a particular data providers rule set can then be determined and displayed at the mobile device.

In the example graphical user interface shown in FIG. 8, there can be a display of an imminent event 810 in the game, for example, a next to bat, a player with the ball, or the like. A total score 820 of one or more players, or a whole lineup, can be displayed. A listing of instant events 830 can be displayed, along with relevant information about the instant event 830 and the change 840 in the total score 820 based on the instant event 830. For example, in FIG. 8, the graphical user interface can display that A. Rodriguez just hit a home run. This example instant event 830 resulted in a change 840 in the total score of +5 FP (fantasy points). Again, the total score 820 can be based on the rules that govern the fantasy game taking place. Different data providers 110 or hosts of the fantasy event can have different rules that apply to the same event. For example, one host may set that a home run is worth 5 points in their game whereas another may set that a home run is worth 10 points. Additionally, other information can be displayed, for example, the time 850 at which the instant event took place, an indication of the lineup, team, or type of sport (shown in FIG. 8 by the diamond 860 representing a baseball diamond), or the like. In some implementations, the changes 840 to the total score 820 can be updated in real-time, or nearly so, and displayed at the mobile device in the form of a scrolling list, a marquee crawler, an updating field, or the like.

As used herein, "real-time" can refer to the retrieval or updating of information or data in the herein described computing systems as fast as can be processed and received by the connected computing systems. "Real-time" contemplates that there can be, for example, network latency, computational time delays, buffering, or the like, in updating or displaying of information. In other implementations of the current subject matter, data can be retrieved or displayed at preset intervals, tied to events with the player, game, or weather, on demand from a user or settings at a central computer, or the like.

Figure 9:
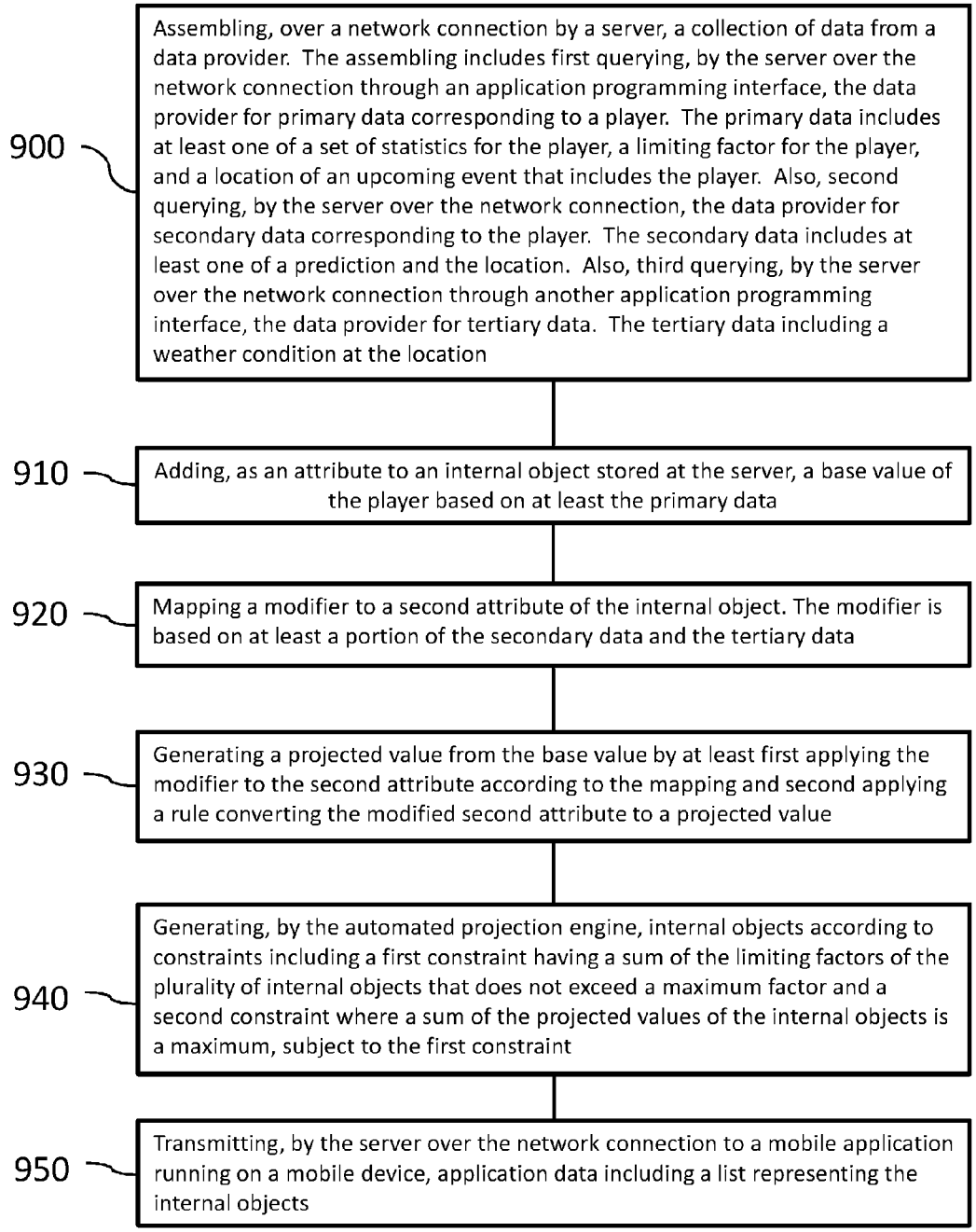
FIG. 9 is a process flow diagram illustrating an automated projection engine generating a collection of internal objects representing a player lineup to a mobile application in accordance with certain aspects of the present disclosure.

FIG. 9 is a process flow diagram illustrating an automated projection engine 140 generating a collection of internal objects 142 representing a player lineup to a mobile application 160 in accordance with certain aspects of the present disclosure.

At 900, over a network connection by a server 130, a collection of data from a data provider 110 can be assembled. The assembling can include first querying, by the server 130 over the network connection through an application programming interface, the data provider 110 for primary data 120 corresponding to a player. The primary data 120 can include at least one of a set of statistics for the player, a limiting factor for the player, and a location of an upcoming event that includes the player. Also, the assembling can include second querying, by the server 130 over the network connection, the data provider 110 for secondary data 122 corresponding to the player. The secondary data 122 can include at least one of a prediction and the location. Also, the assembling can include third querying, by the server 130 over the network connection through another application programming interface, the data provider 110 for tertiary data 124. The tertiary data 124 can include a weather condition at the location.

At 910, a base value of the player based on at least the primary data 120 can be added as an attribute to an internal object stored at the server 130.

At 920, a modifier 144 can be mapped to a second attribute of the internal object. The modifier 144 can be based on at least a portion of the secondary data 122 and the tertiary data 124.

At 930, a projected value can be generated from the base value by at least first applying the modifier 144 to the second attribute according to the mapping and second applying a rule converting the modified second attribute to a projected value.

At 940, the automated projection engine 140 can generate internal objects 142 according to constraints including a first constraint having a sum of the limiting factors of the plurality of internal objects 142 that does not exceed a maximum factor and a second constraint where a sum of the projected values of the internal objects 142 is a maximum, subject to the first constraint.

At 950, the server 130 can transmit, over the network connection to a mobile application 160 running on a mobile device, application data including a list representing the internal objects 142.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, or the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Because of the high-level nature and complexity of the selections and methods described herein, including the multiple and varied combinations of different calculations, computations and selections, such selections and methods cannot be done in real time quickly or at all by a human. The processes described herein rely on the machines described herein.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method comprising:
    monitoring, by a server, a data provider for a change to a type of data associated with a player of a game, the type of data also determining, in part, a projected value of the player as calculated by an automated projection engine, the calculation comprising:
        maintaining an approximately constant computational time when executing a number of iterations randomizing column positions of a column-based list comprising a number of rows having entries of decreasing projected values of a plurality of players in a lineup,
        the maintaining of the approximately constant computational time based on limiting the number of iterations to be inversely proportional to the number of rows,
        the generation of the lineup further comprising sequentially selecting a single entry from each row to be added to the lineup, subject to a first constraint comprising a sum of limiting factors of the lineup that not exceeding a maximum factor;
    converting, by the server, the change to an update of a current value of a player based on at least one rule also used by the automated projection engine to calculate the projected value;
    transmitting the update to a mobile application running on a mobile device, the transmitting causing the mobile device to initiate modification of a graphical display at the mobile device indicating the updated current value of the player; and
    displaying, at the graphical display of the mobile device,
        a vertical band having a length based on a standard deviation of an actual point value corresponding to one of the plurality of players in the lineup, the standard deviation calculated from the primary data over a historical window;
        a first graphical element at a first location collinear with the vertical band and based on the projected point value of the corresponding one of the plurality of players in the lineup; and
        a second graphical element at a second location collinear with the vertical band and based on the actual point value corresponding to an event that the one of the plurality of players in the lineup is associated with.

2. The method of claim 1, wherein the change represents an instant event that occurred in the game in which the player is currently participating.

3. The method of claim 1, further comprising transmitting the projected value to the mobile application for simultaneous display with the current value.

4. The method of claim 1, the monitoring further comprising:
reading, from the data provider, textual or visual representations of the change;
interpreting, by a text-parsing program or an image-recognition program, the textual or visual representation of the change to identify a feature of the change; and
associating the feature with the update; and
the transmitting further comprising transmitting the feature to the mobile application.

5. The method of claim 4, wherein the feature is at least one of a name of the player, an identification of an instant event that causes the change, and a time corresponding to the instant event.

6. The method of claim 5, further comprising initiating, at a graphical user interface of the mobile device, displaying textual or graphical representations of an imminent event for the player, the current value for each player in a lineup, a total value of all players in the lineup, the feature corresponding to the update, a value change to the current value based on the update, and the time of the update.

7. A computer program product comprising a non-transient, machine-readable medium storing instructions which, when executed by at least one programmable processor, cause the at least one programmable processor to perform operations comprising:
monitoring, by a server, a data provider for a change to a type of data associated with a player of a game, the type of data also determining, in part, a projected value of the player as calculated by an automated projection engine, the calculation comprising:
maintaining an approximately constant computational time when executing a number of iterations randomizing column positions of a column-based list comprising a number of rows having entries of decreasing projected values of a plurality of players in a lineup,
the maintaining of the approximately constant computational time based on limiting the number of iterations to be inversely proportional to the number of rows,
the generation of the lineup further comprising sequentially selecting a single entry from each row to be added to the lineup, subject to a first constraint comprising a sum of limiting factors of the lineup that not exceeding a maximum factor;
converting, by the server, the change to an update of a current value of a player based on at least one rule also used by the automated projection engine to calculate the projected value;
transmitting the update to a mobile application running on a mobile device, the transmitting causing the mobile device to initiate modification of a graphical display at the mobile device indicating the updated current value of the player; and
displaying, at the graphical display of the mobile device,
a vertical band having a length based on a standard deviation of an actual point value corresponding to one of the plurality of players in the lineup, the standard deviation calculated from the primary data over a historical window;
a first graphical element at a first location collinear with the vertical band and based on the projected point value of the corresponding one of the plurality of players in the lineup; and
a second graphical element at a second location collinear with the vertical band and based on the actual point value corresponding to an event that the one of the plurality of players in the lineup is associated with.

8. The computer program product of claim 7, wherein the change represents an instant event that occurred in the game in which the player is currently participating.

9. The computer program product of claim 7, further comprising transmitting the projected value to the mobile application for simultaneous display with the current value.

10. The computer program product of claim 7, the monitoring further comprising:
reading, from the data provider, textual or visual representations of the change;
interpreting, by a text-parsing program or an image-recognition program, the textual or visual representation of the change to identify a feature of the change; and
associating the feature with the update; and
the transmitting further comprising transmitting the feature to the mobile application.

11. The computer program product of claim 10, wherein the feature is at least one of a name of the player, an identification of an instant event that causes the change, and a time corresponding to the instant event.

12. The computer program product of claim 11, further comprising initiating, at a graphical user interface of the mobile device, displaying textual or graphical representations of an imminent event for the player, the current value for each player in a lineup, a total value of all players in the lineup, the feature corresponding to the update, a value change to the current value based on the update, and the time of the update.

13. A system comprising:
at least one programmable processor; and
a non-transient machine-readable medium storing instructions which, when executed by the at least one programmable processor, cause the at least one programmable processor to perform operations comprising:
monitoring, by a server, a data provider for a change to a type of data associated with a player of a game, the type of data also determining, in part, a projected value of the player as calculated by an automated projection engine, the calculation comprising:
maintaining an approximately constant computational time when executing a number of iterations randomizing column positions of a column-based list comprising a number of rows having entries of decreasing projected values of a plurality of players in a lineup,
the maintaining of the approximately constant computational time based on limiting the number of iterations to be inversely proportional to the number of rows,
the generation of the lineup further comprising sequentially selecting a single entry from each row to be added to the lineup, subject to a first constraint comprising a sum of limiting factors of the lineup that not exceeding a maximum factor;
converting, by the server, the change to an update of a current value of a player based on at least one rule also used by the automated projection engine to calculate the projected value;
transmitting the update to a mobile application running on a mobile device, the transmitting causing the mobile device to initiate modification of a graphical display at the mobile device indicating the updated current value of the player; and displaying, at the graphical display of the mobile device,
- a vertical band having a length based on a standard deviation of an actual point value corresponding to one of the plurality of players in the lineup, the standard deviation calculated from the primary data over a historical window;
- a first graphical element at a first location collinear with the vertical band and based on the projected point value of the corresponding one of the plurality of players in the lineup; and
- a second graphical element at a second location collinear with the vertical band and based on the actual point value corresponding to an event that the one of the plurality of players in the lineup is associated with.

14. The system of claim 13, wherein the change represents an instant event that occurred in the game in which the player is currently participating.

15. The system of claim 13, further comprising transmitting the projected value to the mobile application for simultaneous display with the current value.

16. The system of claim 13, the monitoring further comprising:
- reading, from the data provider, textual or visual representations of the change;
- interpreting, by a text-parsing program or an image-recognition program, the textual or visual representation of the change to identify a feature of the change; and
- associating the feature with the update; and
- the transmitting further comprising transmitting the feature to the mobile application.

17. The system of claim 16, wherein the feature is at least one of a name of the player, an identification of an instant event that causes the change, and a time corresponding to the instant event.

18. The system of claim 17, further comprising initiating, at a graphical user interface of the mobile device, displaying textual or graphical representations of an imminent event for the player, the current value for each player in a lineup, a total value of all players in the lineup, the feature corresponding to the update, a value change to the current value based on the update, and the time of the update.

* * * * *